(12) United States Patent
Metcalfe et al.

(10) Patent No.: US 6,594,401 B1
(45) Date of Patent: Jul. 15, 2003

(54) DETECTION AND ELIMINATION OF SCANNING ARTIFACTS

(75) Inventors: David J. Metcalfe, Marion, NY (US); Leon C. Williams, Walworth, NY (US); Roger L. Triplett, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/422,117

(22) Filed: Oct. 20, 1999

(51) Int. Cl.[7] .................................................. G06K 9/40
(52) U.S. Cl. ........................ 382/275; 382/173; 382/224
(58) Field of Search .................................. 382/275, 173, 382/180, 224, 254, 282, 283; 358/463, 464

(56) References Cited

U.S. PATENT DOCUMENTS

| | | | |
|---|---|---|---|
| 5,017,963 A | 5/1991 | Tuhro | 355/218 |
| 5,293,433 A * | 3/1994 | Bernsen et al. | 382/275 |
| 5,317,420 A | 5/1994 | Kuwahara | 358/463 |
| 5,761,339 A | 6/1998 | Ikeshoji et al. | 382/176 |
| 5,850,474 A | 12/1998 | Fan et al. | 382/173 |
| 5,872,864 A | 2/1999 | Imade et al. | 382/176 |
| 5,959,290 A | 9/1999 | Schweid et al. | 250/208.1 |
| 6,122,393 A * | 9/2000 | Schweid et al. | 382/275 |
| 6,295,384 B1 * | 9/2001 | Into | 382/275 |

* cited by examiner

*Primary Examiner*—Phuoc Tran
(74) *Attorney, Agent, or Firm*—William Eipert

(57) ABSTRACT

A first aspect of the present invention is a process for masking a scanning artifact within image data representing a document. The process includes generating pixel classification tags for the image data; identifying a window within the image data associated with a scanning artifact using the pixel classification tags; analyzing the image data to derive a replacement video value; and replacing image data associated with a scanning artifact with the replacement video value.

16 Claims, 14 Drawing Sheets

DETECTION AND ELIMINATION OF SCANNING ARTIFACTS

BACKGROUND OF THE INVENTION

The present invention generally relates to systems which scan documents and convert the scanned documents into electronic image data which can be utilized by a printing system to render the electronic image on a subsequent recording medium. More particularly, the present invention is directed to a system and method for detecting and masking scanning artifacts which are produced during the conversion of the image on a scanned document into electronic image data.

In the reproduction of an original document from video image data created, for example, by electronic scanning of the original document, it is often desirable to provide functions dependent upon determining the exterior edges of the document. Such features include, for example, automatic magnification, automatic two-up copying, deletion of background image data which falls outside the detected exterior edges of the document, automatic location of the document in a scanning system, electronic deskewing of the electronic image, etc. In other words, to provide these features, the exterior edges of the document must somehow be detected by the scanning system.

Conventionally, to achieve the detection of the exterior edges of the original document, a backing that has a tendency to be distinguishable from the original document has been provided. For example, such backings have been provided with a yellow color, a black color or a whiter than white color, a backing which fluoresces, and various other alternatives. Although various alternatives have been utilized, when scanning documents utilizing a digital scanning system, it is desirable to utilize a light absorbing (e.g., black or dark) backing so as to eliminate show through when scanning a double-sided or watermarked document. By utilizing a light absorbing backing such as a black color, the scanning system can both eliminate show through when scanning the document and enable the scanning system or other downstream image processing system to automatically locate the exterior edges of the original document, thereby enabling auto-registration and electronic deskewing processes to be performed.

However, an undesirable consequence of using a light absorbing backing is that any defect in the original document; such as holes, cuts, rips, dog-ears, etc. or other characteristic properties of the original; such as pre-punched holes, etc.; appear as black objects when they are rendered and printed on a recording medium. This is due to the fact that the captured image has the backing area's gray value (black) wherever the defect (e.g., pre-punched holes, cuts, rips, dog-ear, etc.) is present in the original document. These areas, where the backing area's gray value is present within the original image, are considered scanning artifacts.

In most cases, it is undesirable to render the scanning artifact in a copy, especially when the background of the copy is white and the artifact is rendered as black. For example, FIG. 1 illustrates an original document 2 comprising image 4 printed on three-hole pre-punched paper such that the three holes are represented by defects 6. If this document is scanned by a conventional system, wherein the backing behind the document, such as a platen cover or an automatic feed roller or ski is non-reflective, the recorded image 12, as shown in FIG. 2, would include dark or black regions 16 (scanning artifacts) which correspond to defects 6 in the original document. Similarly, if the document of FIG. 1 is scanned by a system wherein the backing is white, but is dirty from use, has scratches or otherwise is not of a reflectance equivalent to the document background, the original image as reproduced on a recording or display medium 12 (FIG. 3) may contain scanning artifacts in the form of regions 16 corresponding to defects 6 of the original.

Therefore, it is desirable to be able to scan in an original document having certain defects, such as pre-punched holes, cuts, rips, etc., and to render the image on a recording or display medium void of any evidence of the scanning artifact. In other words, the scanning artifacts should be masked to eliminate or reduce the appearance of the artifacts in the rendered image, notwithstanding the fact that the original document included the defects.

SUMMARY OF THE PRESENT INVENTION

A first aspect of the present invention is a process for masking a scanning artifact within image data representing a document. The process includes generating pixel classification tags for the image data; identifying a window within the image data associated with a scanning artifact using the pixel classification tags; analyzing the image data to derive a replacement video value; and replacing image data associated with a scanning artifact with the replacement video value.

Another aspect of the present invention is a device for masking a scanning artifact within video image data representing a document. The device includes a classification circuit to generate pixel classification tags for the video image data. An autowindowing circuit, connected to receive the pixel classification tags, generates window data identifying scanning artifacts. A statistics compilation circuit, connected to receive the video image data and the window data, generates video replacement data. A video replacement circuit, connected to receive the video replacement data, replaces selected pixels within second pass image data with the video replacement data.

In accordance with another aspect of the present invention there is provided a system for processing image data representing a scanned image. The system includes an image input terminal providing the image data and a masking processor for detecting and masking a scanning artifact within the image data. The masking processor includes a classification circuit for identifying backing pixels within the video image data, an autowindowing circuit for generating window data identifying scanning artifacts, an image analysis circuit for generating video replacement data, and a video replacement circuit for replacing selected pixels within second pass image data with the video replacement data. The system further includes an image output terminal for generating an image in response to the second pass image data received from the video replacement circuit.

BRIEF DESCRIPTION OF THE DRAWINGS

The following is a brief description of each drawing used to describe the present invention, and thus, are being presented for illustrative purposes only and should not be limitative to the scope of the present invention, wherein.

DESCRIPTION OF THE PREFERRED EMBODIMENT

Figure 1:
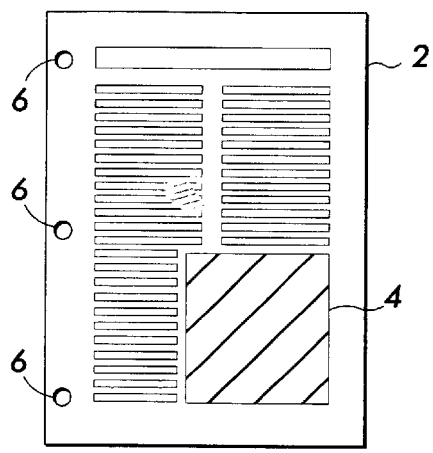
FIG. 1 illustrates an example of an original document with a defect.
Figure 2:
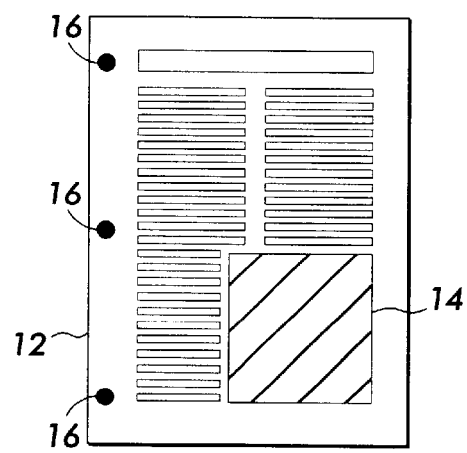
FIGS. 2 and 3 illustrate examples of rendered or displayed copies of the document illustrated in FIG. 1 that retain scanning artifacts.
Figure 3:
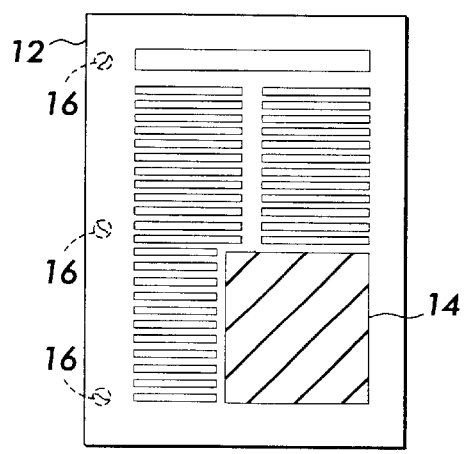

The following will be a detailed description of the drawings illustrated in the present invention. In this description, as well as in the drawings, like reference numbers represent like devices, circuits, or circuits performing equivalent functions.

In the following description, the terms fastscan direction and slowscan direction are utilized. Fastscan direction refers to the scanning of pixels along a scanline or raster. This is also commonly referred to as the electronic scan in that the scanning is a result of collecting image data from an array of photoelectric sensors. Slowscan direction, on the other hand, refers to the direction of the relative movement between the document and the scanning system. This is the mechanical movement that causes the scanning system to generate scanlines of image data.

Figure 16:
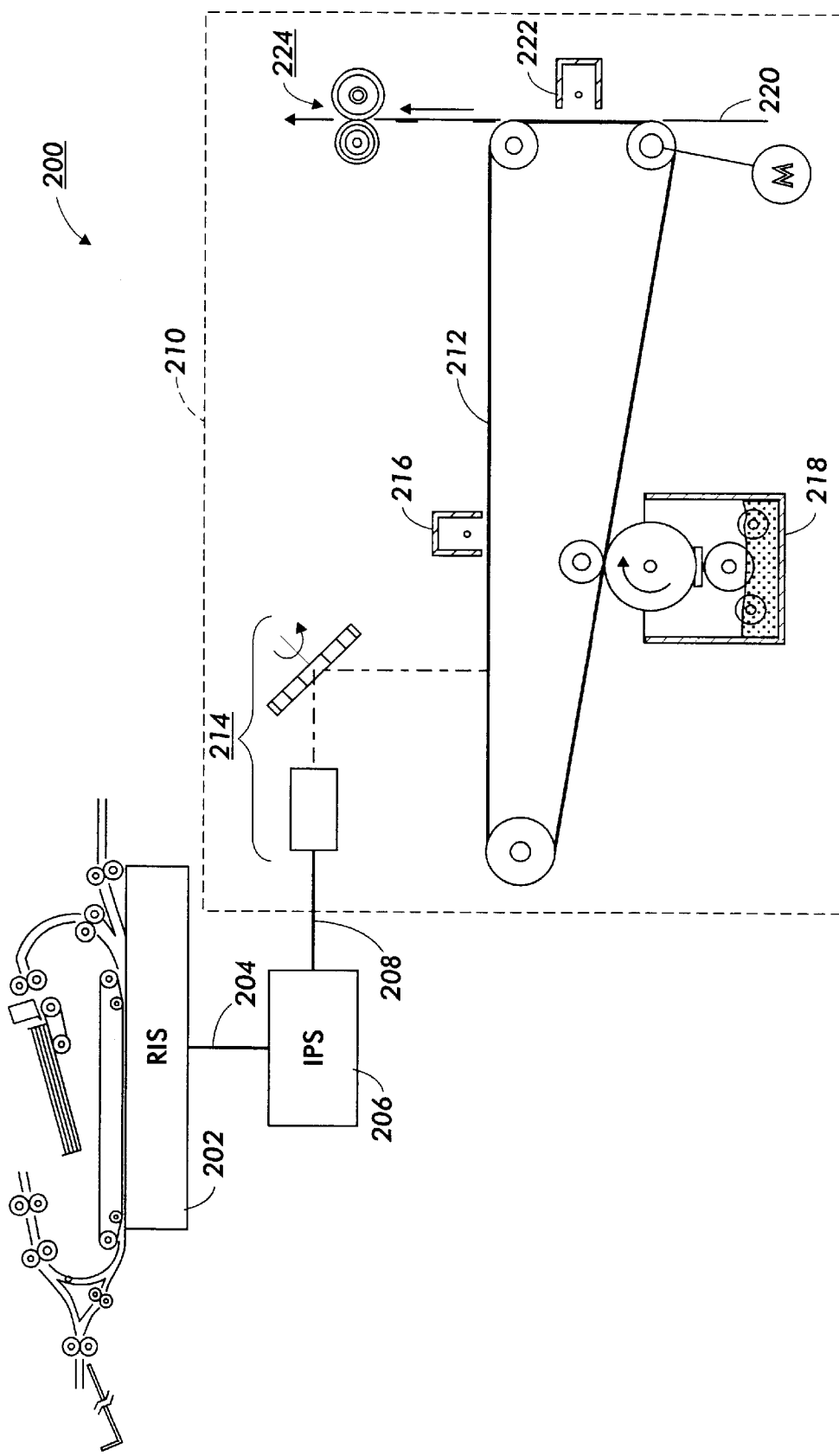
FIG. 16 is a general representation of a suitable system-level embodiment for one or more aspects of the present invention.

Turning now to FIG. 16, there is shown an embodiment of a digital imaging system 200 that incorporates features of the present invention. Digital imaging system 200 includes image source 202 such as a raster input scanner or similar image input terminal to provide image data 204 to image processing system 206. Image data 204 may be obtained through line by line scanning of an image bearing the original by one or more photosensitive elements, such as a multiple photosite array of charge couple devices commonly referred to as CCDs. Although shown as a raster input scanner, it is understood that image source 202 may comprise a computer workstation, a data storage device, a network or any similar or equivalent image input terminal to generate image data 204.

Image processing system (IPS) 206 processes the received image data 204 to produce print ready data 208 that is supplied to image output terminal (IOT) 210. In response to print ready data 208, IOT 210 generates an output image on a suitable media (e.g., print or display). Although illustrated as an electrophotographic print engine, it will become evident from the following discussion that the present invention is useful with a wide variety of output devices such as ink jet, ionographic, thermal, etc. Furthermore, the present invention is not limited in its application to copying and printing machines and may be incorporated in other output terminals such as electronic display systems including CRTs, LCDs, LED, etc.

Image output terminal 210 is shown as operating on print ready data 208 from IPS 206 to generate a document in a single pass of a charge retentive surface in the form of photoreceptor belt 212. In one example, photoreceptor 212 comprises a multi-pitch belt that is written on with an imaging source 214. Imaging source 214 is shown as comprising a laser based raster output scanning device (ROS), although it is to be understood that other sources, for example an LED printbar, might be used. Briefly, photoreceptor 212 is uniformly charged as it passes charging station 216 which may comprise, for example, a corona generating device. The uniformly charged photoreceptor 212 then passes ROS 214 which exposes the photoreceptor in response to image data from IPS 206 thereby forming an electrostatic latent image on the photoreceptor. The electrostatic latent image is then developed with toner at developing station 218 to produce a toner image on belt 212. The toner image is then transferred to a print media 220 at a transfer station 222. After transfer, the image is fused to the print media at a fusing station 224. Upon fusing the resulting print, it may be inverted for duplexing or simply outputted.

It will be apparent to those of ordinary skill in the art that the print engine shown may be modified to generate a color document. For example, by adding successive charging, exposure, and developing stations, a recharge, expose, and develop image on image process can be implemented such that the print engine can produce a color document in a single pass of the photoreceptor. Similarly, the print engine may comprise a single ROS and several developing stations, each having a different color toner. With such a system the print engine can produce a color document using several passes of the photoreceptor through the ROS and charging station wherein each pass is developed at a different developing station.

The present invention is directed towards aspects of image processing system 206 depicted in FIG. 16, and in particular, the present invention is directed to a system and method for processing image data to detect and mask scanning artifacts produced during the conversion of an image on a scanned document into the electronic image data. As noted above, those areas where the gray value of the backing of the scanning system is present within the original image are considered scanning artifacts. The present invention utilizes autowindowing techniques to identify the areas of a scanned image where a scanning artifact exists. A preferred embodiment of the present invention proposes to employ a two-pass autowindowing process wherein the first pass identifies windows comprising scanning artifacts and collects statistics for the windows and the second-pass masks the windows designated as scanning artifacts by replacing the image data associated with the windowed scanning artifacts with image data that "blends in" with the surrounding image areas.

Figure 4:
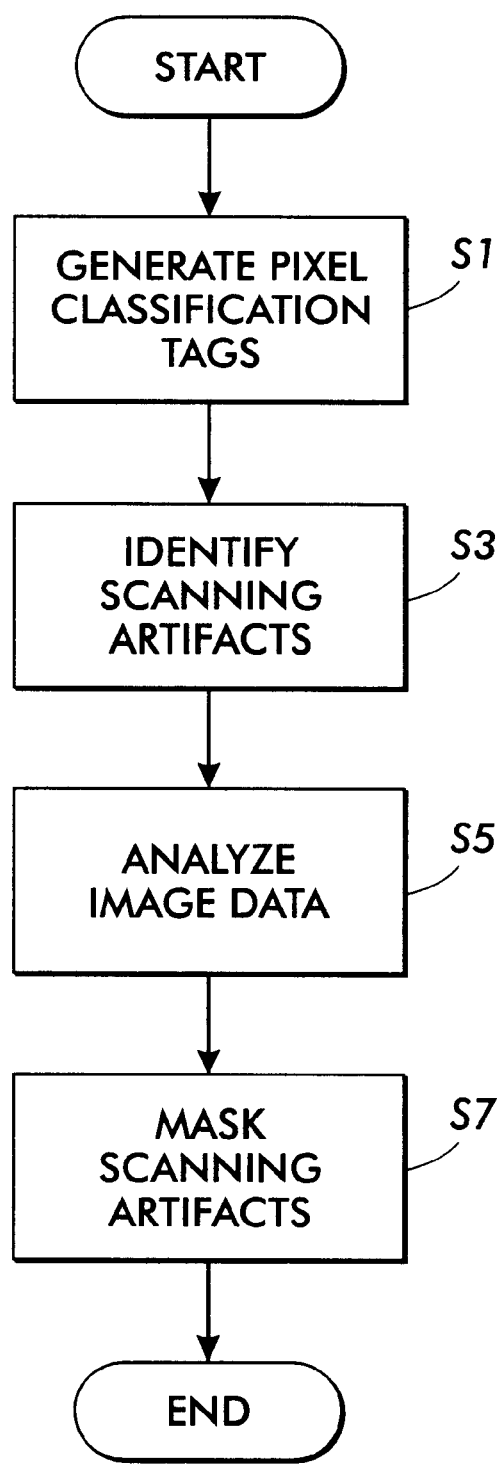
FIG. 4 is a flowchart illustrating an embodiment of a method to detect and mask a scanning artifact according to the concepts of the present invention.

One embodiment of a process employing a two-pass autowindowing technique to detect and mask scanning artifacts is illustrated in FIG. 4. In a two pass process, there is an opportunity to pass through and process the image data twice. In a two-pass autowindowing process, the first-pass processing is used to automatically locate "windows" contained within a scanned image. A window can be any non-background region such as photograph, contone, halftones, text, etc., any combination thereof as well as a scanning artifact. Additionally, during first-pass processing and prior to completion of the second-pass processing, statistics for the windows identified are analyzed to determine which windows, if any, should be adjusted or enhanced. In the second-pass processing, data associated with the windows of the document can be modified to optimize any subsequent image processing operation such as rendering and printing of the image. In the process as illustrated in FIG. 4, steps S1, S3 and S5 correspond to the processing performed in the first pass through the image data and step S7 corresponds to the processing performed on the second pass through the image data.

More specifically, the process generates classification tags for pixels within the video image data at step S1. Step S1 examines pixels in the video image data and generates a classification tag that identifies whether a pixel represents the backing of the scanning system (that is, a backing pixel) and beneficially, includes segmentation data identifying the image type for those pixels that represent the document image (non-backing pixels). Step S3 analyzes the classification tags generated at step S1 to identify windows in the scanned image, record the position of each window within the scanned image and classify each window.

At step S5 video image data is analyzed. More specifically, statistics are gathered from the video image data, and using information from step S3, image data statistics corresponding to the windows identifying scanning artifacts can be analyzed to determine an appropriate video value to be used to mask each scanning artifact. Step S7 uses the information collected at steps S3 and S5 to modify the image data to mask the scanning artifacts within the scanned image data. The modified image data can then be processed to generate print ready data that can be used to create an output image on suitable media.

Figure 5:
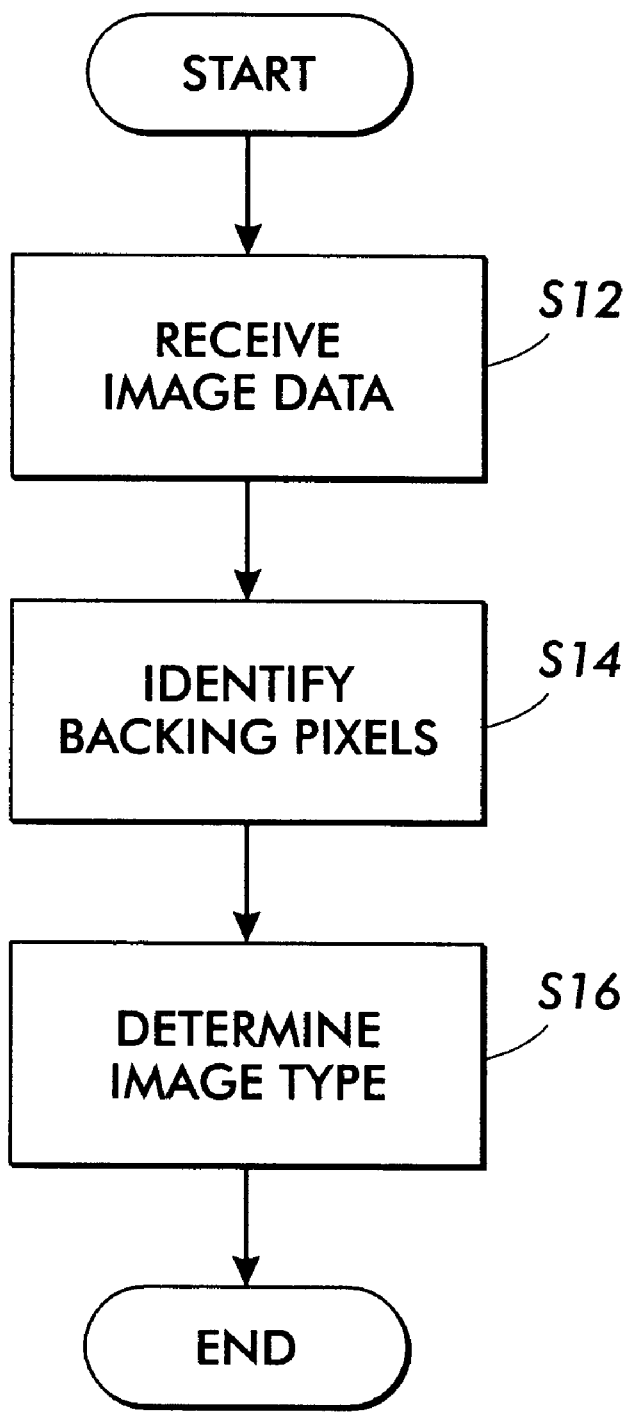
FIG. 5 is a flowchart illustrating a process to classify pixels according to the concepts of the present invention.

FIG. 5 shows in more detail the process for classifying pixels within the image data carried out in step S1 of FIG. 4. In this process, step S12 receives video image data which generally comprises a plurality of scanlines with each scanline comprising image data such as intensity information for a plurality of pixels. Step S12 buffers multiple scanlines of the received image data into memory and identifies a target pixel and its neighbors. The image data for the target pixel and its neighbors are analyzed to generate a classification tag for the target pixel.

Backing detection step S14 examines the target pixel and its neighbors to determine if the image data for the target pixel represents a backing pixel or the document image. A backing pixel refers to a pixel whose image data represents light reflected from or generated from the backing of the scanning system. Step S14 can use any method for identifying backing pixels to make a determination as to the type of pixel. One such method for identifying backing pixels determines a cost value for the target pixel for one or more detection criteria based upon the characteristics of the backing (such as the gray value, the variation in gray in a fastscan or slowscan direction, etc.), aggregates the cost values and classifies the pixel as a backing pixel if the aggregate cost is at an acceptable threshold. Additionally, the scanning system may employ a separate set of sensors that detects light having a specific wavelength corresponding to light reflecting from the backing or originating from behind the document. Moreover the scanning system may use a set of sensors that are designed to be responsive to the image on the document and be saturated when scanning the backing and another set of sensors which see black when scanning the backing due to the backing reflectance. Such methods for determining whether a target pixel is a backing pixel or a document image pixel are disclosed by Schweid et al. in U.S. Pat. No. 5,959,290 which is incorporated herein by reference.

Segmentation step S16 performs a segmentation operation that and analyzes the image data for the target pixel and its neighbors to determine the image type of the target pixel. Some common image types include: edge, graphics, text, text on tint, background, smooth contone, rough contone, low-frequency halftone, high-frequency halftone, intermediate frequency halftones which may be implemented as fuzzy frequencies, etc. The analysis and determination of image type can be based upon any of a number of well known classification functions including, but not limited to, auto-correlation, frequency analysis, pattern or template matching, peak/valley detection, histograms, etc. For example, step S16 may determine whether the intensity of each pixel is significantly different than the intensity of the surrounding neighboring pixels and, if so, classify the pixel as an edge pixel.

Although the process above indicates that backing detection step S14 and image segmentation step S16 are separate operations, which may be performed in any order or in parallel, the backing detection step S14 may be combined within the segmentation operation S16. That is, a backing pixel can be thought of as another image type and the backing detection operation may be considered a classification function within the segmentation operation. In another embodiment, backing detection step S14 may be performed first followed by segmentation step S16 operating only on those pixels determined not to be backing pixels (i.e., identified as document pixels).

Figure 6:
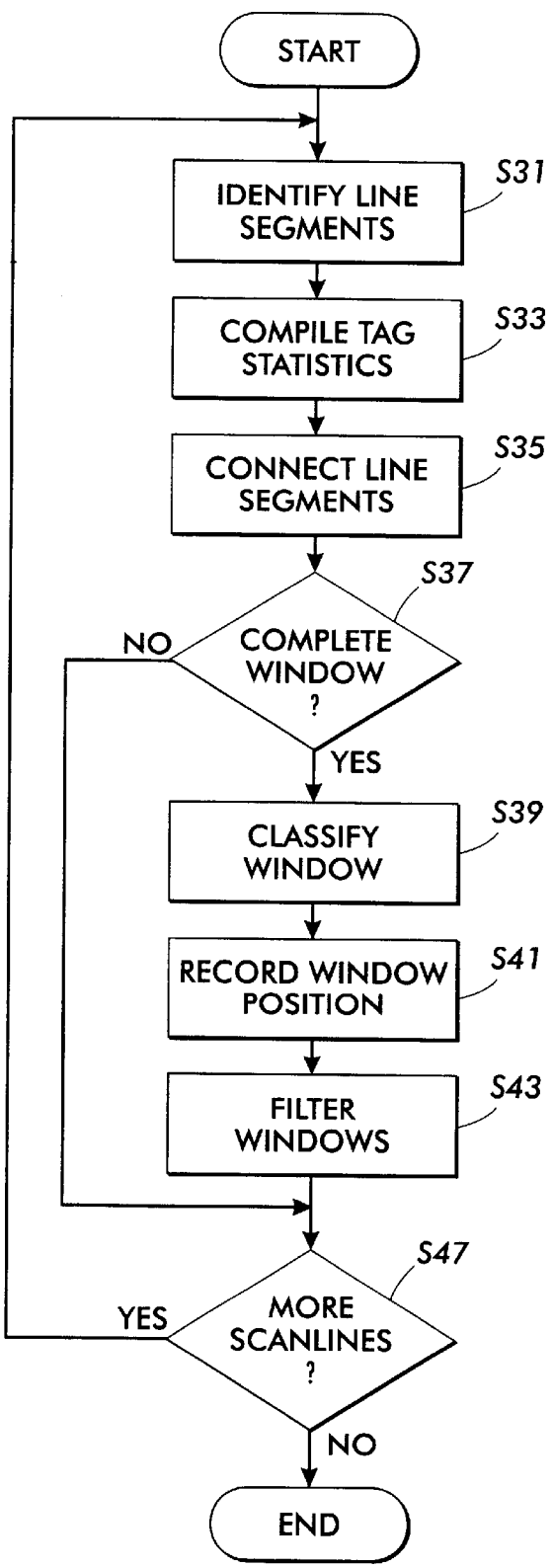
FIG. 6 is a flowchart illustrating an embodiment of an autowindowing process according to the concepts of the present invention.
Figure 7:
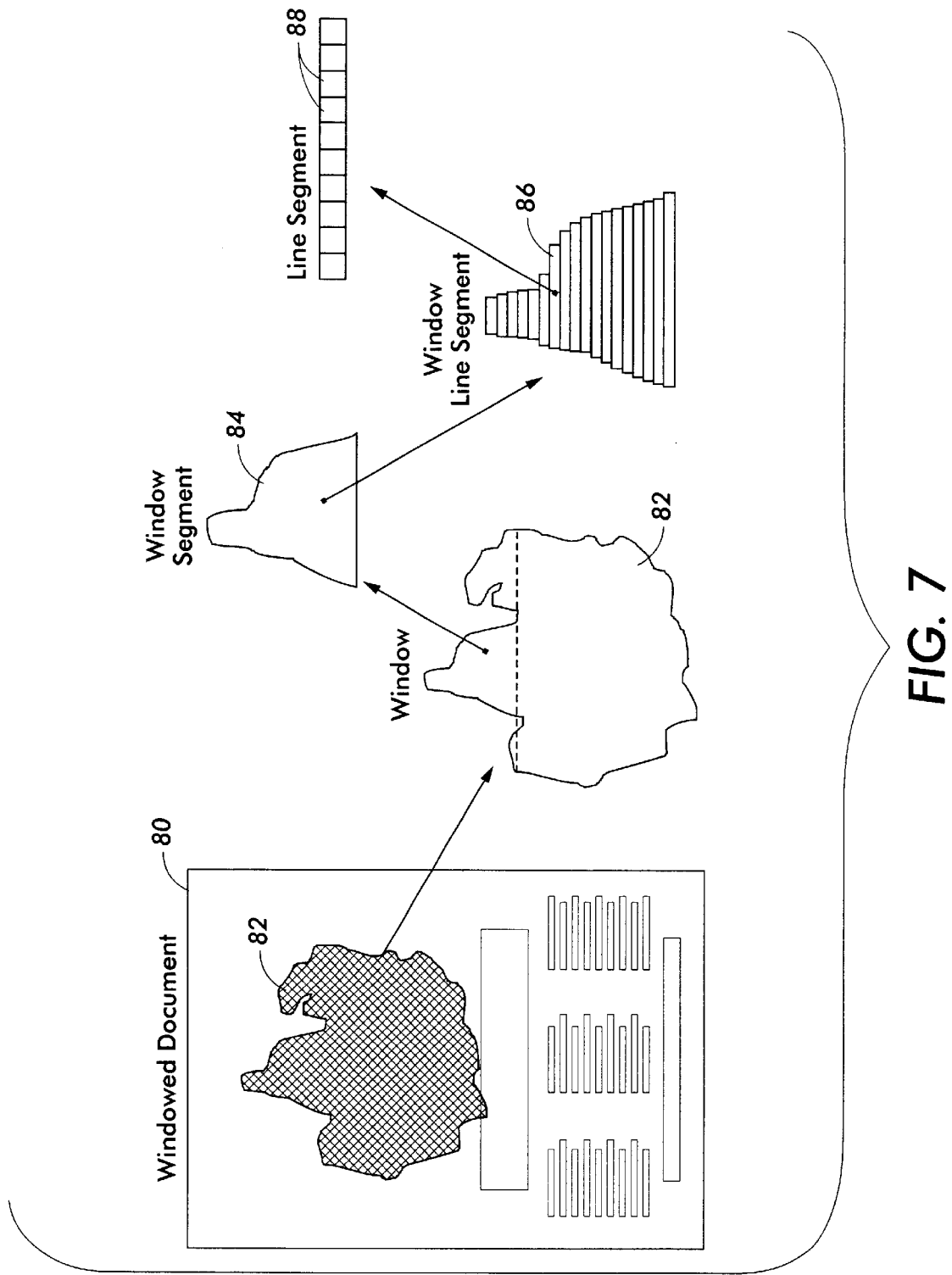
FIG. 7 schematically illustrates components of a window generated by an autowindowing operation.

Referring now to FIG. 6, there is shown an embodiment of a process to carry out the autowindowing operation of step S3. To better understand the identification of windows, a schematic illustration depicting of the components of a window generated by an autowindowing operation is shown in FIG. 7. A document 80 may comprise one or more windows, such as window 82. Each window 82 can be broken down into one or more window segments, such as window segment 84, which in turn can be decomposed into one or more line segments 86. Each line segment represents a single, contiguous grouping of pixel classification tags 88 from a given scanline.

Referring again to FIG. 6, at step S31 pixel classification tags are received and any line segments within a scanline are identified. Each line segment comprises a contiguous grouping of pixel tags meeting predetermined window criteria. One such criterion for identification of a window selects groups of pixel tags between pixel tags that are edges. Other window criteria identifies line segments comprising one or more selected image types. That is, the window criteria may require that the line segment be comprised of pixel tags identifying specific image types.

Step S33 compiles statistics for the pixel classification tags within each line segment identified in step S31. The tag statistics compiled will be used in classifying the window in which the line segment resides. Possible statistics which may be compiled include the number of each different pixel tag type, the frequency distribution of each of the different pixel tags, the predominate pixel tag type, a weighted count of pixel tag types, etc.

Step S35 connects line segments from adjacent scanlines to form window segments. Beneficially, after identifying the line segments within a current scanline, step S35 compares the line segments from the current scanline with any existing window objects (line segments or window segments) in the previous scanline. If a line segment from the current scanline has a threshold number of pixel tags that are adjacent to an existing window object, then the line segment is connected to the existing window object. When one or more line segments from a current scanline are connected to an existing window object, the statistics compiled for the current line segment(s) are combined with the statistics for the existing window object.

Step S37 determines if there are any completed windows within the scanned image. An existing window object ends and becomes a completed window when no line segments from the current scanline can be connected to the window object. If a completed window is not identified, the autowindowing process determines if there are more scanlines to process at step S47. If there are more scanlines, the process continues with the identification of line segments in step S31. When a completed window is identified, the process performs window classifying, recording and filtering operations at steps S39, S41 and S43 for the completed window.

Step S39 determines a window classification from the compiled window statistics. The statistics are examined in an attempt to classify each window. Any number of options are available to generate a window classification from the compiled statistics. For example, a window that appears to contain primarily a single type of image data can be classified according to its dominant image type. Windows that primarily contain backing pixels are identified (classified) as scanning artifacts. A further option classifies windows that contain more than one image type as "mixed." Moreover, it is noted that the window classification is not limited to a single image type. For example, a window may be classified as the predominant and second most predominant pixel tags within the window. As a further example, step S39 may classify a window as those pixel tags having more than predetermined percent of the total number pixel tag occurrences.

Step 41 determines and records the position of the window within the scanned image. The position of the window can be identified using any known method sufficient to later identify the pixels contained within the window. It will be appreciated by those skilled in the art that numerous methods exist for recording the position of the window within a scanned image. Examples of possible methods include identifying the start of each line segment and the length of the segment; recording the starting and ending pixel of each segment and recording the location of the first pixel within a window with each window or line segment identified as an offset therefrom. The above examples are provided for illustrative purposes only and do not limit the present invention to the use of one of the above examples.

Window filtering step S43 filters the completed windows to discard small windows. This filtering operation is designed to ensure that the number of windows identified does not overwhelm the system memory and/or does not greatly increase system processing time. Factors which may determine the appropriate window size can include processing speed and throughput, memory, window classification, image size, image resolution, etc. Furthermore, it should be appreciated that as an alternative to (or in addition to) filtering completed windows, a filtering operation may be used to filter the line segments identified in step S31 to discard small line segments.

Figure 8:
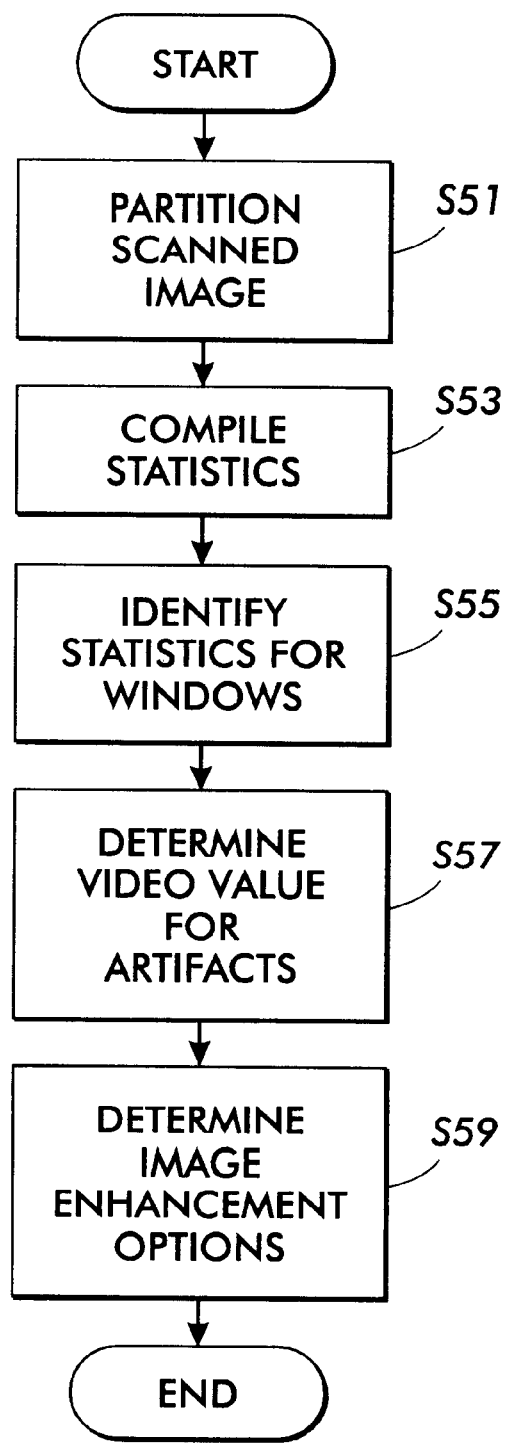
FIG. 8 illustrates an embodiment of a process for compiling and analyzing image data statistics.

FIG. 8 shows more details of the process carried out in step S5 of FIG. 4. More specifically, FIG. 8 illustrates an embodiment of a process for compiling and analyzing image data statistics. As noted above, the image data statistics for windows classified as scanning artifacts are analyzed to determine the appropriate image data to replace the image data for the scanning artifact. Additionally, the statistics may be used to determine image anhancement options to improve or optimize the rendering of a windowed area to enhance the image quality.

The compilation of image data statistics begins with the receipt of pixel image data at step S51. Image statistics must be available for each of the windowed areas of the scanned image. Rather than wait until a windowed area has been identified to collect statistics, step S51 partitions the scanned image into a plurality of statistic collection regions with image data statistics being compiled for each of the collection regions. The collection regions within any windowed area can then be later retrieved for analysis. Beneficially, the scanned image data is partitioned into M×N blocks of pixel image data arranged in a rectangular grid. The size of the blocks may be varied based upon a number of factors such as the scanning resolution, the size of the scanned document, memory requirements, etc. However, it is understood that regions of varying sizes and shapes and/or regions arranged at any angle can be used as well.

Step S53 compiles image data statistics for each of the partitioned regions. To compile the image data statistics for a given statistic collection region (e.g., an M×N block), the pixel image data that comprises the block must be identified. The identification of a block of pixel image data can be accomplished using a windowing technique wherein the received image data is stored in a buffer and, when a sufficient number of pixels have been stored, a block of pixels is selected from the buffer for examination and compilation of statistics. Alternatively, the associated block for each pixel may be identified as each pixel is received. Step S53 can compile any number of image data statistics such as contrast statistics (e.g., histogram data and histogram average), exposure statistics (e.g., black points and white points), color balance statistics (e.g., minimum, maximum and average RGB values), neutral statistics (e.g., average chroma value), etc. Step S55 uses information from the autowindowing operation of step S3 to identify the image data statistics for the blocks associated with a window. The number of blocks associated with a window will depend upon the size and shape of the window as well as the size and shape of the blocks. The blocks associated with a window beneficially comprise those blocks that are entirely within the window and may also include those blocks that are partially within or adjacent to the window. Furthermore, the blocks associated with a window may vary based upon the window classification and location.

After identifying the image data statistics at step S55, step S57 analyzes the identified statistics to determine gray or color video value(s) for the scanning artifact that blends in with the surrounding area. For example, if a scanning artifact falls within a pictorial area, step S57 may determine a video value that blends with or closely matches the surrounding values by identifying the most predominant video value or an average video value from blocks near the scanning artifact. Furthermore, when identifying video values for masking a scanning artifact, step S57 may identify video values that vary across the artifact. For example, step S57 may use a gradient or slope detection to identify video values that change from light to dark or between colors across the scanning artifact. Similarly, if a scanning artifact is isolated or falls within a background area, step S57 may identify the video value(s) that match the background color from global statistics collected for the entire document.

Optionally, analysis step S59 can be performed to analyze the image data statistics to determine the appropriate image enhancement options for a window. Possible analysis performed at step S59 may include computing a histogram variance, comparing exposure and/or color balance statistics, etc. Based on the compiled statistics and the analysis, one or more of a window's parameters such as exposure level, color balance, contrast, saturation, etc. may be adjusted to develop one or more unique tone-reproduction curves (TRCs) for the window.

Figure 9:
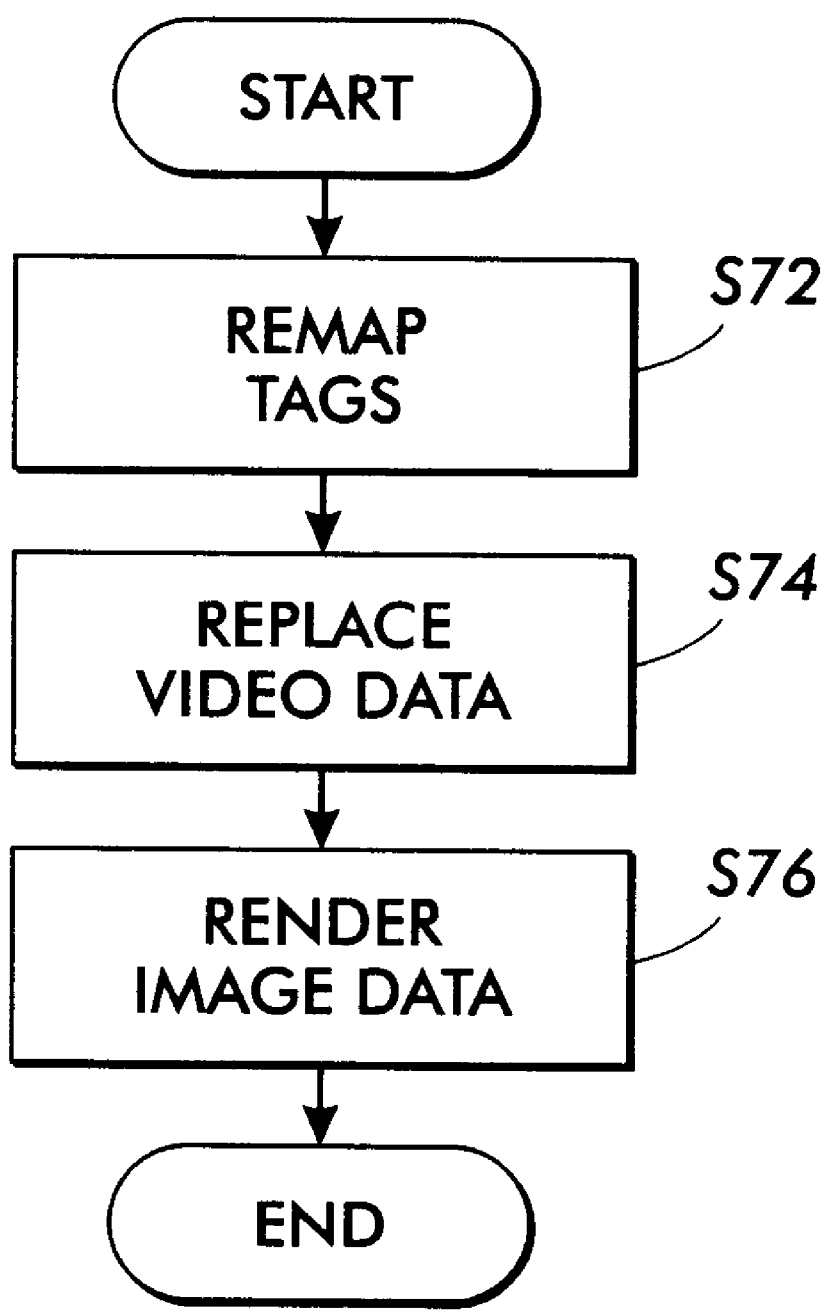
FIG. 9 is a flowchart illustrating processing performed in a second pass through image data.

FIG. 9 is a flowchart illustrating, in more detail, processing performed on the second pass through the image data. In particular, the second pass processing operates on second pass video image data and second pass classification tags to mask the scanning artifacts within the scanned image data. The second pass video image data may comprise the (first pass) image data retrieved from memory or other storage location or may comprise image data obtained by rescanning the original image document. Similarly, second pass classification tags may comprise the first pass tags retrieved from memory or other storage location or classification tags generated from video image data retrieved from memory or obtained by rescanning.

Tag remapping step S72 modifies the first pass pixel classification tags. Step S72 identifies the first pass pixel classification tags that correspond to the windows identified at step S3 and replaces those tags with a classification tag generated as a function of the window classification and the classification tag. For example, for scanning artifacts falling within another window, a tag remapping function may replace the tags associated with the scanning artifact with the classification of the surrounding window.

Video replacement step S74 modifies the video image data by identifying those pixels that correspond to windows classified as a scanning artifact and replacing the image data for the identified pixels with the video values determined in step S57 to blend in with the surrounding image data. At step S76 the modified video image data is rendered in accordance with the modified classification tags.

Figure 10:
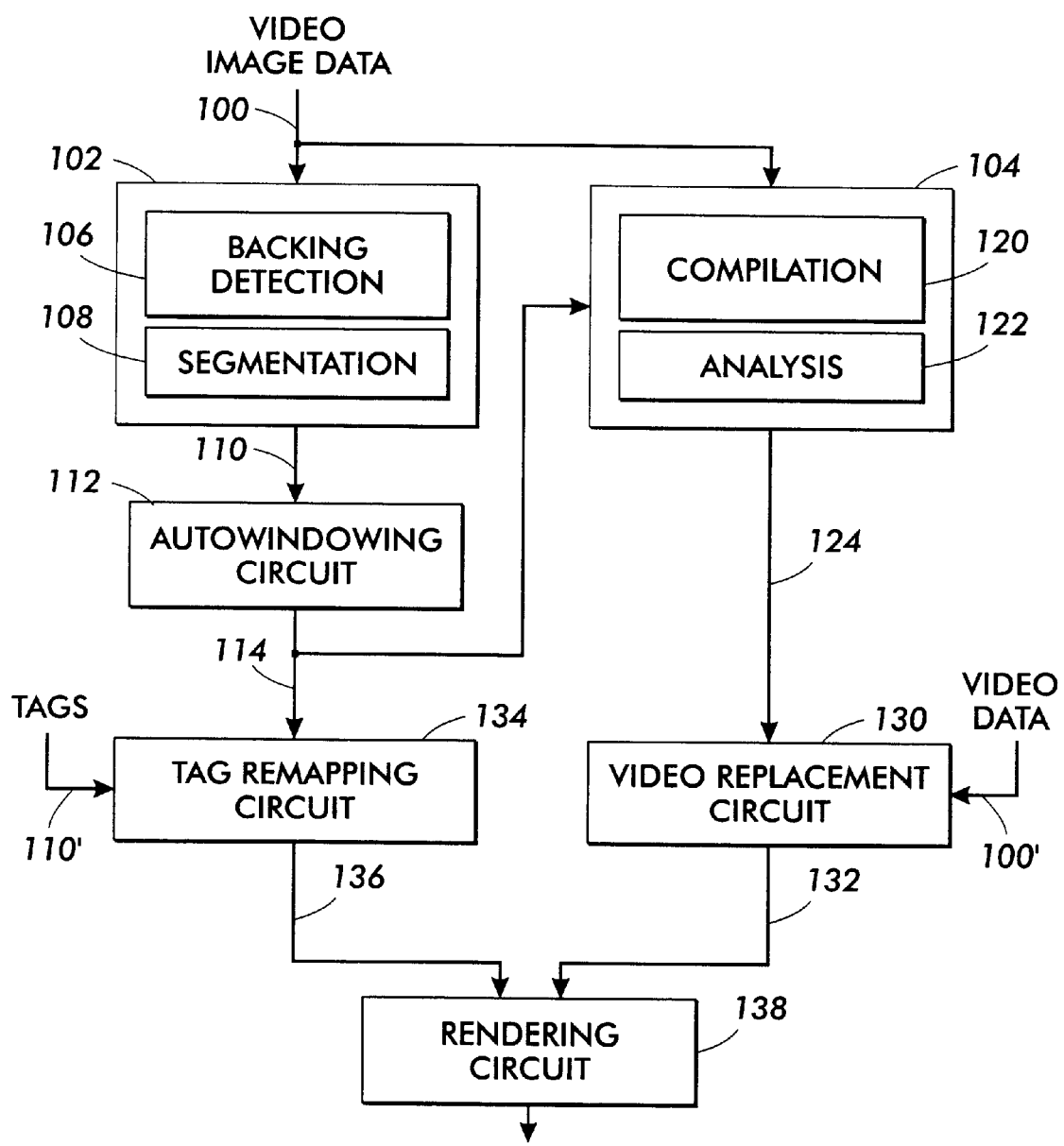
FIG. 10 is a schematic diagram of a device to detect and mask scanning artifacts according to the concepts of the present invention.

Having described a method using a two-pass autowindowing technique to detect and mask scanning artifacts in a scanned document, attention is now turned to a discussion of a system for processing scanned image data to detect and mask scanning artifacts. Referring now to FIG. 10, there is shown a block diagram of a system, according to one embodiment of the present invention, which detects scanning artifacts and corrects image data to mask the detected artifacts.

As illustrated in FIG. 10, video image data 100 representing a scanned image document is supplied to classification circuit 102 and image data statistics compilation circuit 104. Classification circuit 102 includes a backing detection stage 106 to identify backing pixels and a segmentation stage 108 to identify the image type of pixels. Backing detection stage 106 and segmentation stage 108 combine to generate classification tags 110.

Classification tags 110 are fed to autowindowing circuit 112 which identifies windows representing possible scanning artifacts and generates window data 114 for the identified windows. More specifically, autowindowing circuit 112 identifies any line segments within a scanline; compiles statistics for each line segment; connects line segments to build window segments; and filters, locates and classifies windows. Methods and devices for implementing autowindowing are known and are taught, for example, by Fan et al. in U.S. Pat. No. 5,850,474 incorporated herein by reference.

As described above, video image data 100 is also fed to image data statistics compilation circuit 104. Statistics compilation circuit 104 includes compilation stage 120 and analysis stage 122. Compilation stage 120 collects image data statistics such as contrast statistics, exposure statistics and color statistics on the incoming video image data 100 for each of number of M×N blocks. Analysis stage 122 uses window data 114 from autowindowing circuit 112 to identify specific M×N blocks associated with the windows identified by the autowindowing circuit. Analysis stage analyzes the compiled statistics for one or more of the associated blocks to identify video values for masking the scanning artifact. Analysis stage 122 provides video replacement signal 124 identifying the video values to use in masking the scanning artifacts.

In the second pass processing, second pass video image data 100' is fed to data replacement circuit 130 which generates modified video image data 132 in response to video replacement signal 124. More specifically, image data 100' and video replacement signal 124 are fed to image data replacement circuit 130 which replaces pixels within image data 100' that correspond to windows classified as a scanning artifact with the video values in signal 124. Similarly, second pass classification tags 110' and window data 114 are fed to tag remapping circuit 134 which replaces pixel classification tags that correspond to a window with a classification tag generated as a function of the window classification and the second pass classification tag to generate remapped classification tags 136. The remapped classification tags 136 and modified video image data 132 are fed to rendering circuit 138 wherein the modified video image data is rendered in accordance with the remapped classification tags.

One skilled in the art would understand that each of the circuits of FIG. 10 may individually or in combination with one or more other circuits comprise a general or special purpose computer, a microprocessor or microcontroller and peripheral integrated circuit elements, an ASIC or other integrated circuit, a hardwired electronic or logic circuit such as a discrete element circuit, a programmable logic device such as a PLD, PLA, FPGA or PAL, or the like. Furthermore, specific operations may be accomplished using software in combination with specific hardware.

Figure 11:
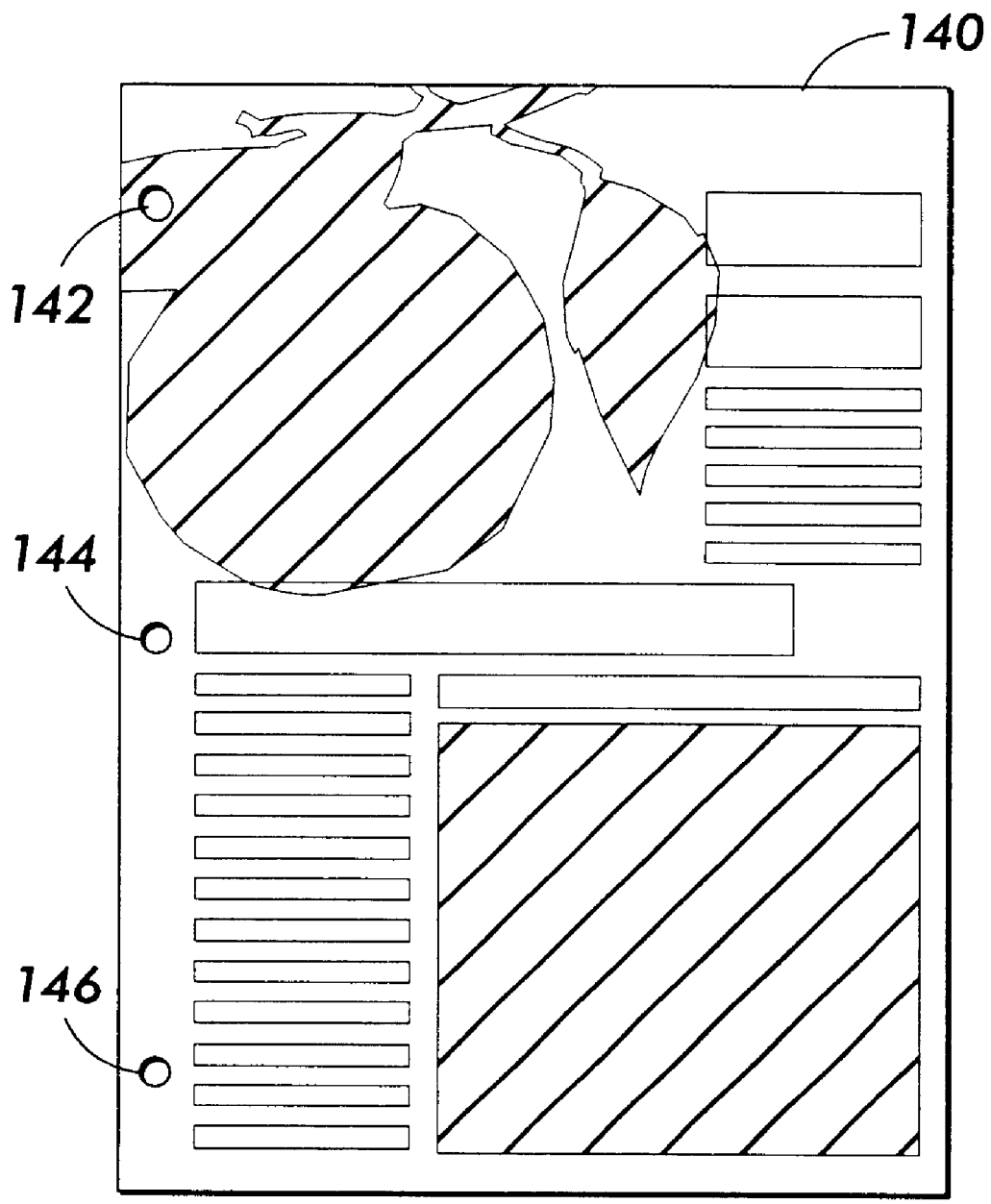
FIG. 11 illustrates an example of an original document with a defect.
Figure 12:
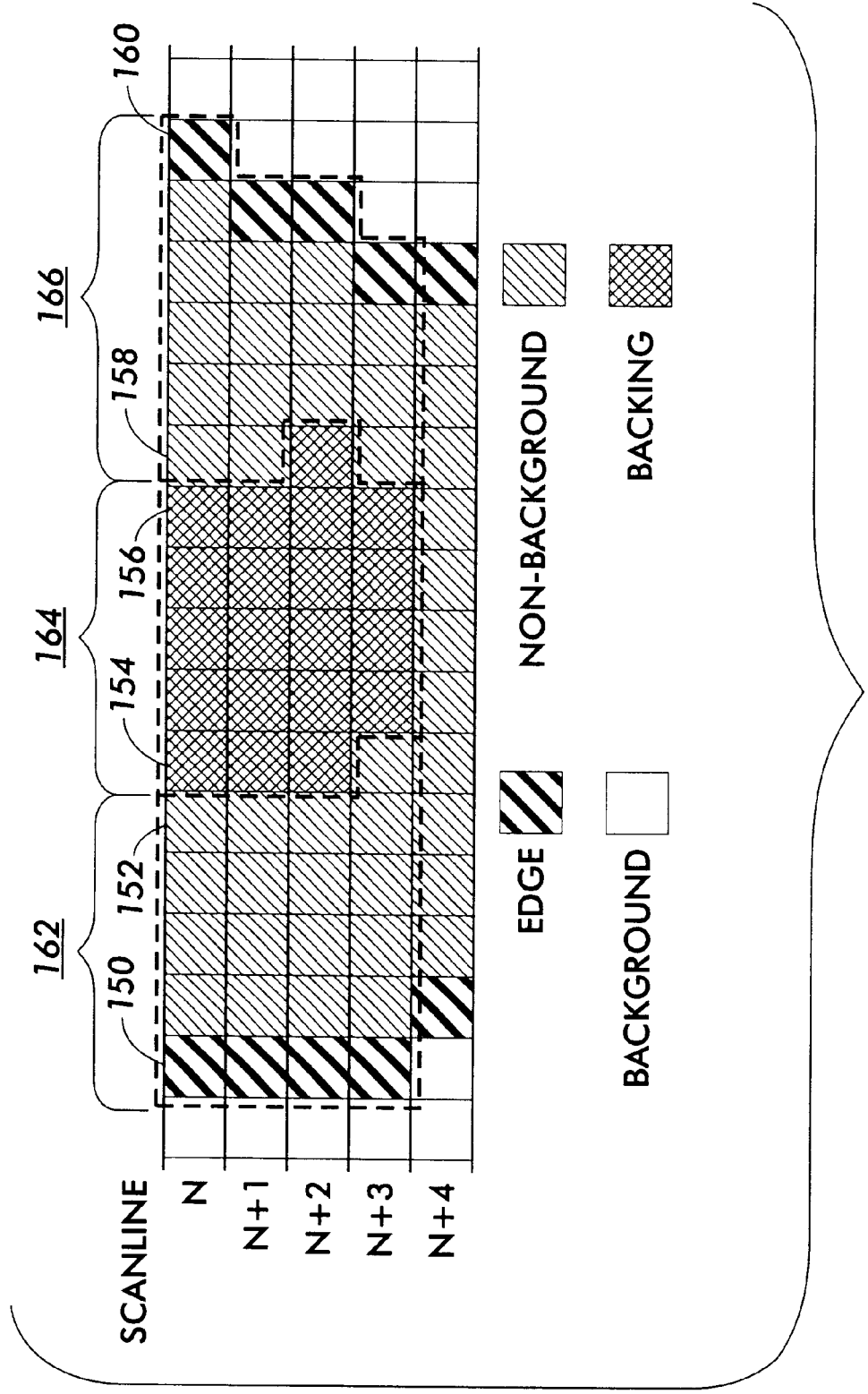
FIG. 12 shows a graphical representation of pixel classification tags for a portion of several scanlines of image data.

An example of how of a two-pass autowindowing process in accordance with an embodiment of the present invention can be used to detect and mask scanning artifacts is illustrated with further reference to FIGS. 11–15. For this example, video image data representing original document 140 of FIG. 11 is processed to mask scanning artifacts such as from the three holes 142, 144 and 146 in three-hole pre-punched paper. The video image data is processed through a classification operation to generate a classification tag for each pixel. FIG. 12 graphically represents the results of the classification step for a portion of several scanlines of image data.

An autowindowing operation processes the classification tags to identify window line segments within each scanline; compile statistics for each line segment; connect line segments to build window segments; and filter, locate and classify completed windows. For example, operating on the image data shown in FIG. 12, window selection criteria may be employed to identify three line segments in scanline N: a first segment of non-background pixels from pixel 150 through pixel 152, a second segment from pixel 154 through 156 comprising pixels identified as backing pixels and a third segment from pixel 158 through 160. Classification tag statistics are compiled for each of the three line segments identified.

In each of the next three scanlines N+1 through N+3, three similar line segments will be identified and statistics will be compiled for each. As the identification of line segments and collection of statistics occur on a scanline to scanline basis, the autowindowing operation must periodically connect line segments from successive scanlines to build window segments. Through scanline N+3, the autowindowing operation will connect each of the three line segments identified in a scanline to the respective line segments in adjacent scanlines form window segments 162,164, and 166.

Figure 13:
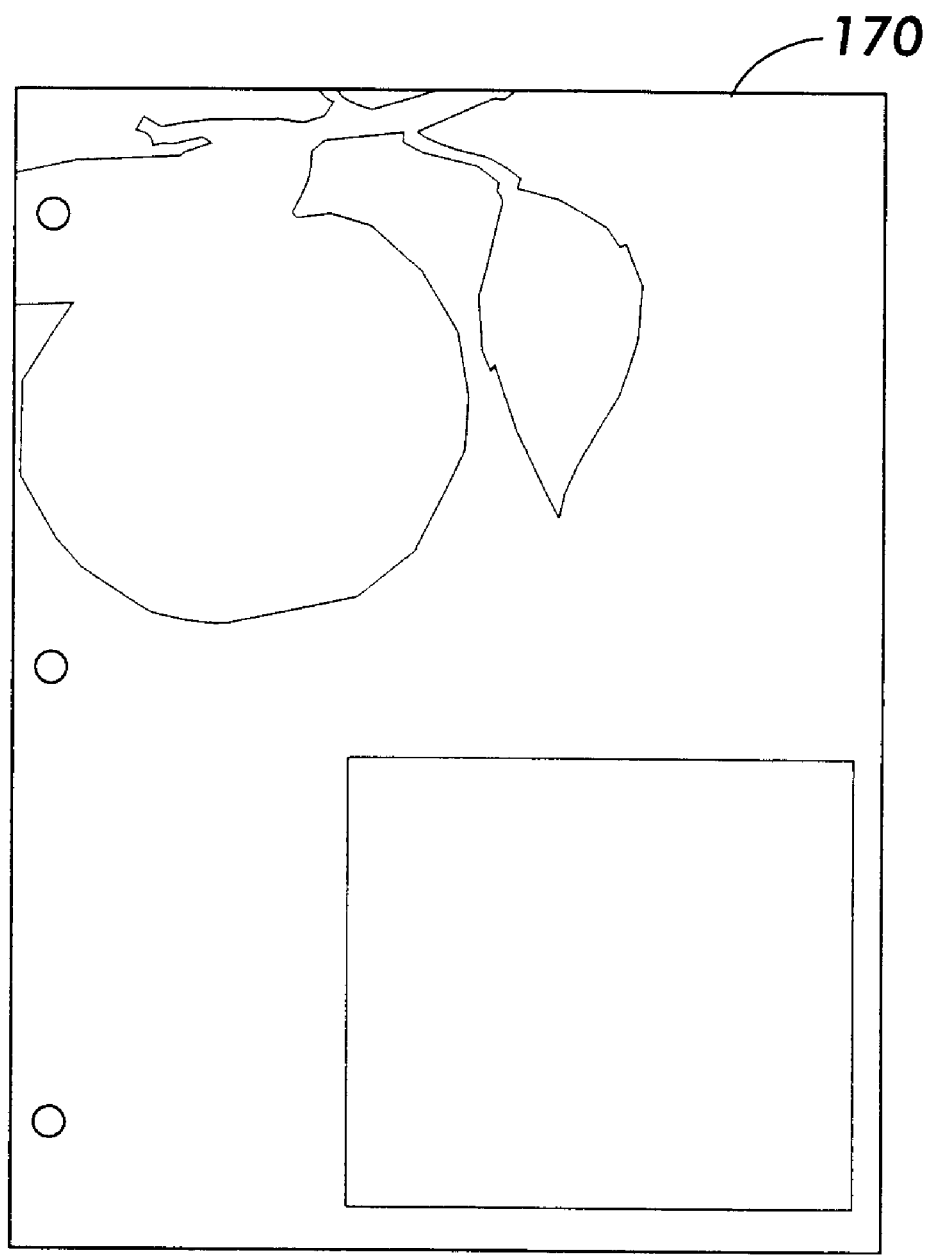
FIG. 13 shows a graphical representation of the windows identified in the document of FIG. 11.

At scanline N+4, the operation can identify that window segments 162 and 166 are connected such that the tag statistics for the two segments can be merged to form a single window segment. Additionally, at scanline N+4 it can be determined that window segment 164 has ended thereby forming a completed window. After identifying the completed window, a determination can be made whether to retain the window (i.e., the completed widow is filtered), the window classification can be generated and the location of the window can be recorded. The autowindowing operation provides an output identifying the location and classification of windows in the document. FIG. 13 graphically illustrates window data 170 for the windows identified for the document of FIG. 11.

Figure 14:
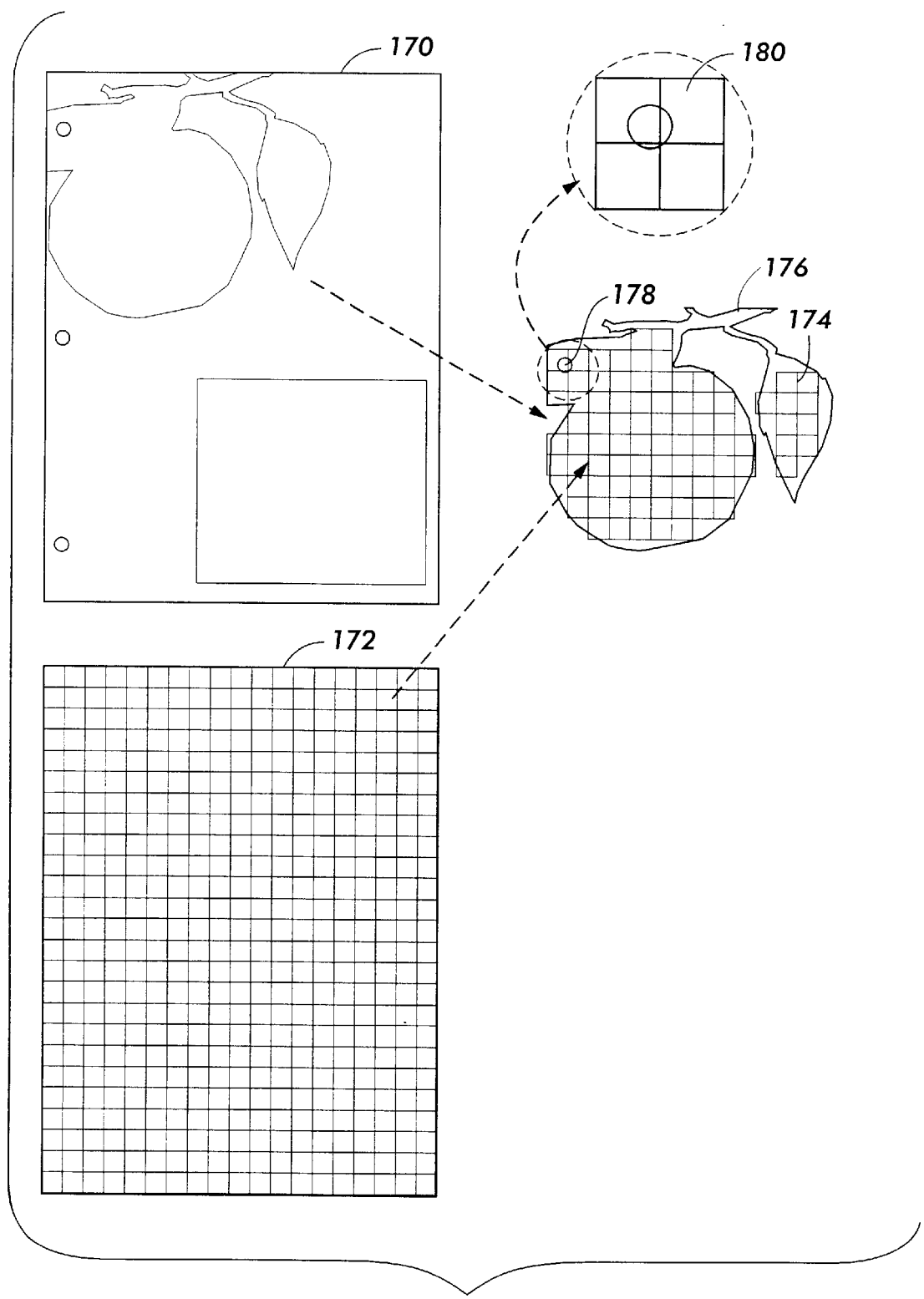
FIG. 14 shows a graphical representation of the compilation and analysis of image data statistics.

As described above, the video image data is passed through a process for compiling and analyzing image data statistics. FIG. 14 graphically illustrates the compilation and analysis process. The compilation of image data statistics requires the document image be partitioned into a plurality of M×N blocks 172. Image data statistics such as contrast statistics, exposure statistics and color statistics are collected on the incoming video image data for each of the M×N blocks 172. Using the window information 170 generated via the autowindowing operation, the specific M×N blocks 174 associated with any window 176 can be identified.

Once blocks 174 associated with a window are identified, the statistics compiled for one or more of the identified blocks 174 can be analyzed. For example, for scanning artifact 178 falling within a window 176, statistics for only those blocks 180 that are adjacent to or neighboring the artifact may be analyzed to derive video values for masking the scanning artifact. Likewise, for isolated scanning artifacts, video values for masking the scanning artifact may be based upon and derived from the entire document's background histogram.

Figure 15:
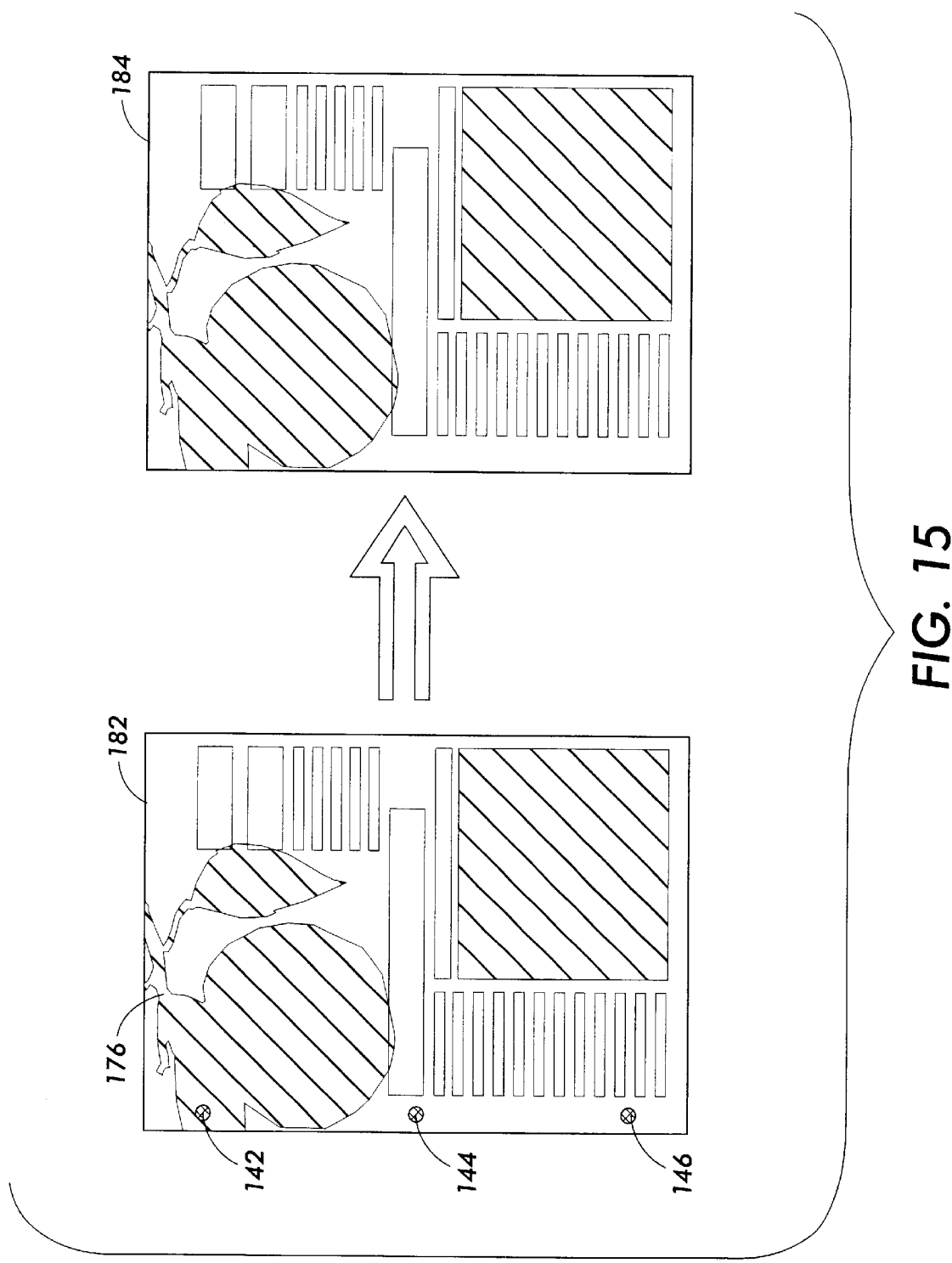
FIG. 15 illustrates the masking of scanning artifacts using video values derived from the analysis of image data statistics.

The video replacement operation performed in the second pass processing to mask scanning artifacts is graphically illustrated in FIG. 15. In FIG. 15, document 182 illustrates the first pass video image data for the windows in document 140 of FIG. 11, and document 184 illustrates the second pass video image data for the windows of document 140 after the video replacement operation. In document 182, the video data associated with holes 142, 144 and 146 is shown as having a value that represents the backing of the scanning system. In document 184, the video value for hole 142 has been replaced with video data derived from blocks within window 176 while the video image data for holes 144 and 146 have been replaced with data derived from the global statistics collected for the entire document.

In summary, the present invention provides a system and method for detecting a scanning artifact and processes the image data associated with the scanning artifact. In one embodiment of the present invention, the present invention utilizes a two-pass autowindowing process wherein the first pass identifies windows comprising scanning artifacts and collects image data statistics and the second-pass masks the windows designated as scanning artifacts by replacing the image data associated with the windowed scanning artifacts with image data derived from global image data statistics. In another embodiment of the present invention, the present invention utilizes the image data derived from local image data statistics. Moreover, the scanning artifact detection system and method of the present invention can be readily implemented on an application specific integrated circuit, various logic circuits, or in software, thereby enabling the incorporation of this process in a scanner, electronic subsystem, printer, or other image processing device.

While the present invention has been described with reference to various embodiments disclosed herein, it is not to be confined to the details set forth above, but it is intended to cover such modifications or changes as made within the scope of the attached claims.

What is claimed is:

1. A process for masking a scanning artifact within image data representing a document, comprising the steps of:

generating pixel classification tags for the image data;

identifying a window within the document associated with the scanning artifact using the pixel classification tags;

analyzing the image data to generate a replacement video value; and replacing second pass image data associated with the scanning artifact with the replacement video value.

2. The process of claim 1, wherein the replacement video value is derived from a global statistic.

3. The process of claim 1, wherein the replacement video value is derived from image data adjacent to the scanning artifact.

4. The process of claim 1, wherein the analyzing step comprises:

identifying a region of the document; and deriving the video replacement value from image data within the region.

5. The process of claim 4, wherein the deriving step comprises:

compiling a statistic for the image data within the region; and generating the video replacement value as a function of the compiled statistic.

6. The process of claim 1, wherein the analyzing step comprises:

partitioning the document into a plurality of regions;

identifying a region associated with the scanning artifact; and deriving the video replacement value from image data within the identified region.

7. The process of claim 6, further comprising:

compiling a statistic for the image data within a region;

wherein the video replacement value is derived from the compiled statistic.

8. The process of claim 1, wherein the pixel classification tags identify backing pixels within the image data.

9. The process of claim 8, wherein the pixel classification tags further identify an image type of a pixel if the image data for the pixel represents the document.

10. A device for masking a scanning artifact within video image data representing a document, comprising:

a classification circuit generating pixel classification tags for the video image data;

an autowindowing circuit connected to receive the pixel classification tags, the autowindowing circuit generating window data identifying scanning artifacts;

a statistics compilation circuit connected to receive the video image data and the window data, the statistics compilation circuit generating video replacement data; and a video replacement circuit connected to receive the video replacement data, the video replacement circuit replacing selected pixels within second pass image data with the video replacement data.

11. The device of claim 10, wherein the statistics compilation circuit comprises:

a statistics compilation stage compiling a statistic for the video image data within of number of statistics collection regions; and an analysis stage deriving the video replacement data from a compiled statistic.

12. The device of claim 10, wherein the analysis stage derives the video replacement data from a collection region adjacent to the scanning artifact.

13. The device of claim 11, wherein the analysis stage derives the video replacement data from a global statistic.

14. The device of claim 10, wherein the classification circuit comprises a backing detection stage identifying backing pixels within the video image data.

15. The device of claim 10, further comprising a tag remapping circuit connected to receive second pass classification tags and the window data, the tag remapping circuit replacing selected pixel classification tags with a classification tag generated as a function of a window classification.

16. A system for processing image data, comprising:

an image input terminal providing image data representing a scanned image;

a masking processor for detecting and masking a scanning artifact within the image data, the masking processor including, a classification circuit for identifying backing pixels within the video image data, an autowindowing circuit for generating window data identifying scanning artifacts, an image analysis circuit for generating video replacement data, and a video replacement circuit for replacing selected pixels within second pass image data with the video replacement data; and an image output terminal for generating an image in response to the second pass image data received from the video replacement circuit.

* * * * *